(12) United States Patent
Weiss et al.

(10) Patent No.: US 6,554,115 B2
(45) Date of Patent: Apr. 29, 2003

(54) ROTATIONAL CONTROL APPARATUS WITH VARIABLE ACTUATION METHODS

(75) Inventors: Kevin B. Weiss, Stillwater, MN (US); Dave Hein, Oakdale, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 0 days.

(21) Appl. No.: 09/931,988

(22) Filed: Aug. 17, 2001

(65) Prior Publication Data

US 2003/0034221 A1 Feb. 20, 2003

(51) Int. Cl.⁷ .............................................. F16D 25/00

(52) U.S. Cl. ................... 192/85 A; 192/91 A; 188/170; 188/167

(58) Field of Search .................. 192/85 A, 91 A, 192/66.31, 66.32; 29/401.1; 188/167, 170

(56) References Cited

U.S. PATENT DOCUMENTS

| | | |
|---|---|---|
| 2,502,798 A | 4/1950 | Nabstedt et al. |
| 2,586,617 A | 2/1952 | Danly |
| 2,661,148 A | 12/1953 | Englander |
| 2,698,676 A | 1/1955 | Eason |
| 2,741,353 A | 4/1956 | Ward |
| 2,753,031 A | 7/1956 | Light |
| 2,806,568 A | 9/1957 | Buss |
| 2,905,290 A | 9/1959 | Munschauer |
| 2,909,255 A | 10/1959 | Chung |
| 2,927,563 A | 3/1960 | Geiger |
| 2,983,124 A | 5/1961 | Spase |
| 3,011,607 A | 12/1961 | Englander |
| 3,036,681 A | 5/1962 | Crosby |
| 3,077,252 A | 2/1963 | Treer |
| 3,145,816 A | 8/1964 | De Lorean et al. |
| 3,199,646 A | 8/1965 | McBride |
| 3,253,687 A | 5/1966 | Young |
| 3,306,407 A | 2/1967 | Smirl |
| 3,396,909 A | 8/1968 | Seifert |

(List continued on next page.)

FOREIGN PATENT DOCUMENTS

| | | |
|---|---|---|
| DE | 1575251 | 10/1969 |
| DE | 2815474 | 10/1979 |
| FR | 1551796 | 11/1968 |
| FR | 2393191 | 12/1978 |
| GB | 534220 | 3/1941 |
| GB | 646128 | 11/1950 |
| GB | 737774 | 9/1955 |
| GB | 907936 | 10/1962 |
| GB | 1115729 | 5/1963 |
| GB | 2018369 | 10/1979 |
| GB | 2036202 | 6/1980 |

Primary Examiner—Rodney H. Bonck
Assistant Examiner—Eric M. Williams
(74) Attorney, Agent, or Firm—Alan D. Kamrath; Rider, Bennett, Egan & Arundel

(57) ABSTRACT

Apparatus (10) for controlling rotation of an input (12) in the most preferred form of a brake includes a housing (50) which can be positioned in either first or second positions. In the first position, a piston (66) moves out of its cavity (64) in the housing (50) and forces a plate (76a) including the piston (66) and an interface facing (80) toward an interface disc (20) while a release spring (92) located in a countersink (74) acts on a fastener (98) to move the first plate (76a) away from the interface disc (20). When flipped to the second position, the piston (66) moves out of its cavity (64) in the housing (50) and forces a second plate (76b) interconnected to the first plate (76a) away from the interface disc (20) while engaging springs (90) sandwiched in cavities (70) between the housing (50) and the first plate (76a) including the interface facing (80) force the first plate (76a) toward the interface disc (20). Thus, apparatus (10) can be assembled to be either fluid engaged or fluid released from the same components, with the use of the same components to construct rotational control apparatus (10) with different actuation methods resulting in lower component fabrication and inventory costs.

20 Claims, 2 Drawing Sheets

U.S. PATENT DOCUMENTS

| | | |
|---|---|---|
| 3,446,430 A | 5/1969 | Elmer |
| 3,468,402 A | 9/1969 | Edwards |
| 3,500,970 A | 3/1970 | Schilling |
| 3,526,302 A | 9/1970 | Grant et al. |
| 3,527,329 A | 9/1970 | Jordan |
| 3,744,608 A | 7/1973 | Newman |
| 3,762,517 A | 10/1973 | Hanks |
| 3,805,931 A | 4/1974 | Portmann |
| 3,880,265 A | 4/1975 | Elmer |
| 3,887,051 A | 6/1975 | Bignell |
| 3,985,214 A | 10/1976 | Hall et al. |
| 4,071,940 A | 2/1978 | Hazelton |
| 4,226,311 A | 10/1980 | Johnson et al. |
| 4,238,017 A | 12/1980 | Spokas |
| 4,245,724 A | 1/1981 | Beck |
| 4,304,321 A | 12/1981 | Wong |
| 4,312,433 A | 1/1982 | Bopp |
| 4,355,710 A | 10/1982 | Schilling |
| 4,418,807 A | 12/1983 | Raines |
| 4,425,993 A | 1/1984 | Schilling |
| 4,460,079 A | 7/1984 | Hanks |
| 4,657,126 A * | 4/1987 | Hanks et al. ............ 192/48.91 |

* cited by examiner

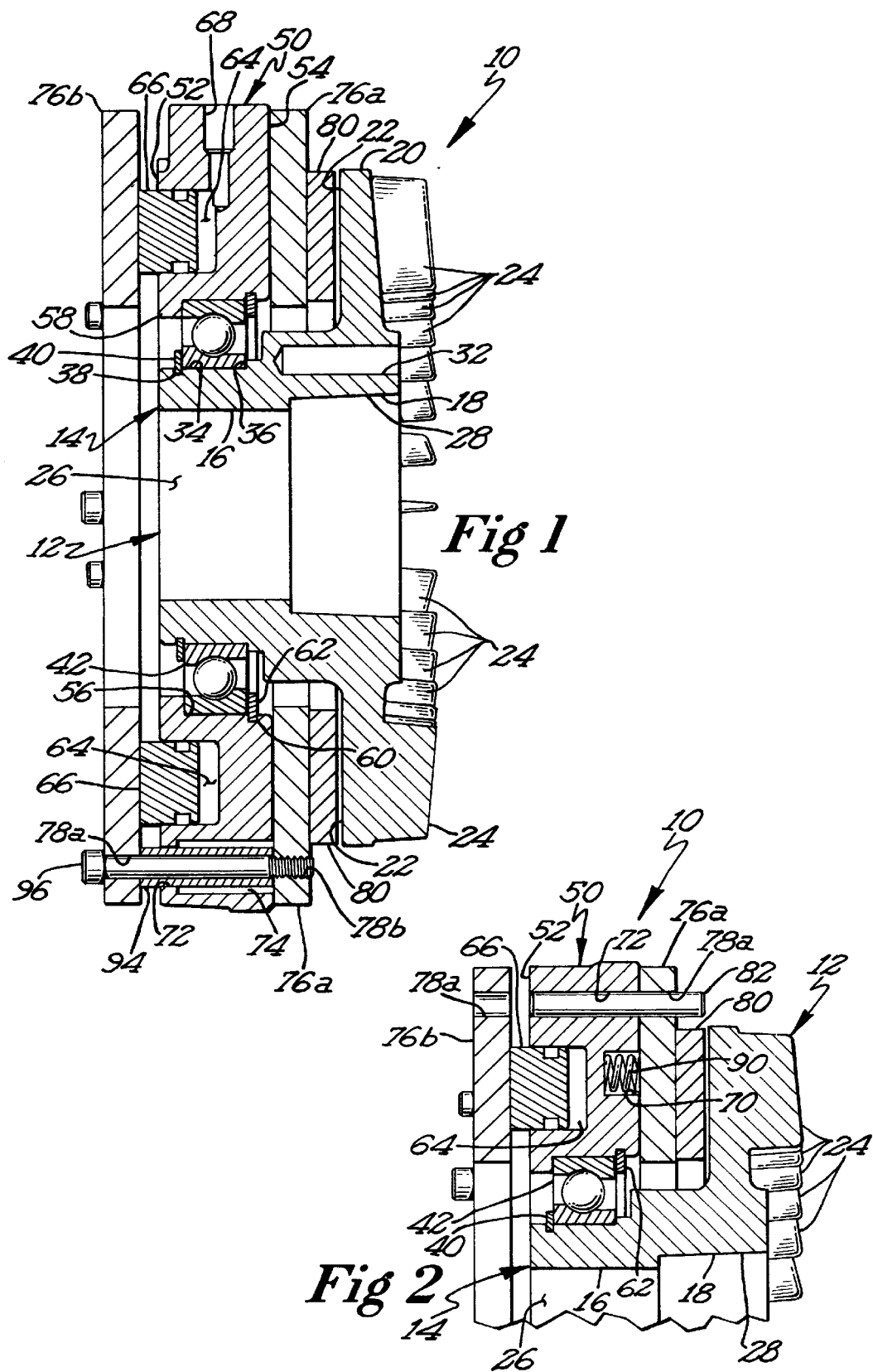

ROTATIONAL CONTROL APPARATUS WITH VARIABLE ACTUATION METHODS

BACKGROUND

The present invention generally relates to rotational control apparatus, particularly to rotational control apparatus with variable actuation methods, more particularly to rotational control apparatus which can be assembled to be either fluid engaged or fluid released, and specifically, in the preferred form, to a brake with variable actuation methods.

In rotation control, many apparatus rely upon fluid pressure to create motion and force. The motion and force are transmitted through an axially moving piston which moves an interface facing relative to an interface surface. When the interface facing is forced against the interface surface, their interface causes the input to match the rotational speed of the interface facing which in the preferred form of a brake is zero. The force of the interface is directly dependent on the area or size of the interface facing and surface.

When fluid pressure is relied upon to create motion and force in one direction, motion and force is often created in the opposite direction by springs. Specifically, springs tend to bias the interface facing to move in a first direction and fluid pressure tends to move the interface facing in the opposite direction against the bias of the spring force. It of course can also be realized that the first direction can be towards or away from the interface surface, and there are applications when one or the other would be best. As an example, in a brake application, it is often desired that spring force move the interface facing toward the interface surface because in the event of a power failure, rotation is braked as a safety precaution rather than allowing the possibility of free rotation of the input.

Conventionally, rotational control apparatus were typically manufactured for a particular actuation method, namely for being spring engaged or spring released. The disadvantage of such prior practice is that the components, especially the larger cast components, are unique for each application. Thus, increased capital costs for casting and inventory result because generally two sets of different components are required. This is especially a problem for larger size apparatus as the casting costs are amplified because of the larger size components and because the reduced demand for large size apparatus in comparison to the numbers of apparatus sold for smaller size applications.

U.S. Pat. Nos. 4,425,993 and 4,460,079 are examples of prior attempts to address this problem. However, these constructions have limited utility to particular applications, with these constructions showing the desirability of variable actuation methods but do not provide the suggestion of accomplishing that desirability in other applications and/or in other manners.

Thus, a need continues to exist for rotational control apparatus with variable actuation methods to reduce the number of different components which are needed to be manufactured and inventoried and which have utility in more varied applications.

SUMMARY

The present invention solves this need and other problems in the field of rotational control apparatus with variable actuation methods by providing, in the preferred form, rotationally positioning a first plate including an interface facing upon an input with the interface facing adapted to interface with an interface disc of the input. A piston is slideably received in a piston cavity in a housing which is rotatably mounted on the input. The housing is rotatably mounted on the input in one of two positions, and specifically where slideable movement of the piston out of the piston cavity is towards the interface disc causing interface between the interface disc and facing in the first position or is away from the interface disc causing axial separation of the interface disc and facing in the second position.

In most preferred forms, the housing includes first and second axial sides and is positioned in one of the first and second positions by flipping so that either the first or the second axial side is initially slideably received on the input.

In preferred aspects, the housing includes both engaging spring cavities formed on the axial side opposite to the piston cavity and countersinks formed on the same axial side as the engaging spring cavities but for receiving release springs and concentric to the through bores for receiving actuation interconnection spacer elements for spring engaged actuation.

It is thus an object of the present invention to provide a novel apparatus for controlling rotation of an input.

It is further an object of the present invention to provide such novel rotational control apparatus with variable actuation methods.

It is further an object of the present invention to provide such novel rotational control apparatus of different actuation methods but generally formed of the same components.

It is further an object of the present invention to provide such novel rotational control apparatus of different actuation methods utilizing the same fluid cavity defined by a piston and piston cavity in the housing.

It is further an object of the present invention to provide such novel rotational control apparatus where the housing can be positioned on the input to allow the piston sliding out of the piston cavity to move towards or away from the interface disc.

It is further an object of the present invention to provide such novel rotational control apparatus in the preferred configuration of a brake where the housing is held in a stationary condition.

It is further an object of the present invention to provide such novel rotational control apparatus having variable actuation methods and having utility in more varied applications.

These and other objects and advantages of the present invention will become clearer in light of the following detailed description of an illustrative embodiment of this invention described in connection with the drawings.

BRIEF DESCRIPTION OF THE DRAWINGS

The illustrative embodiment may best be described by referring to the accompanying drawings where:

FIG. 1 shows a cross sectional view of a rotational control apparatus fabricated in accordance with the preferred teachings of the present invention to be fluid released and spring engaged.

FIG. 2 shows a partial cross sectional view of the rotational control apparatus of FIG. 1.

Figure 3:
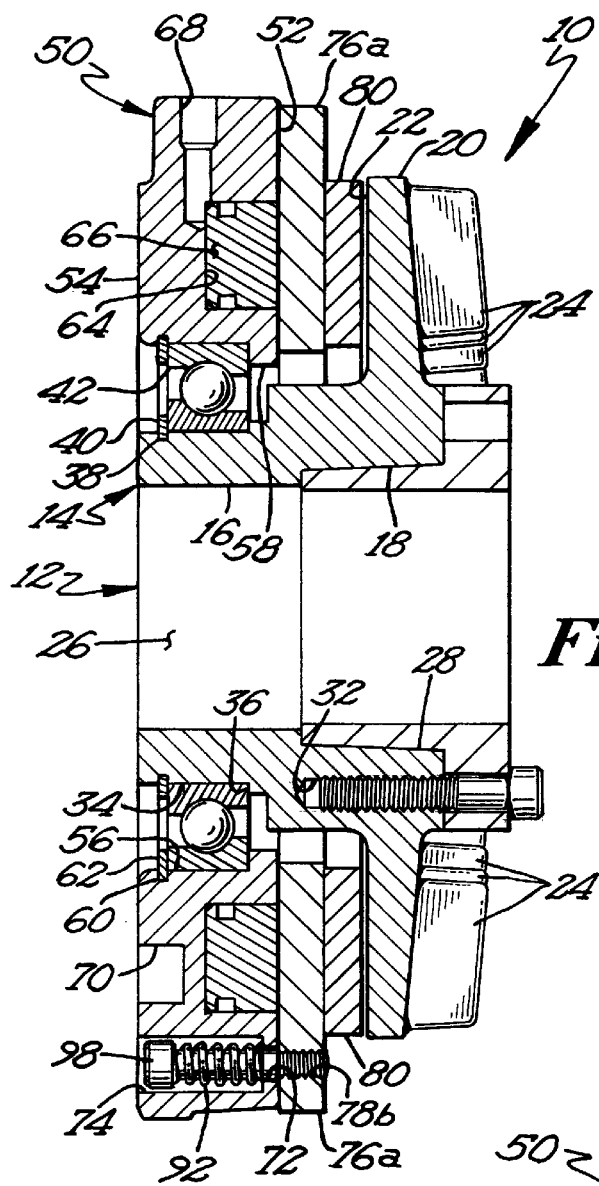
FIG. 3 shows a cross sectional view of the rotational control apparatus of FIG. 1 but fabricated in accordance with the preferred teachings of the present invention to be fluid engaged and spring released.
Figure 4:
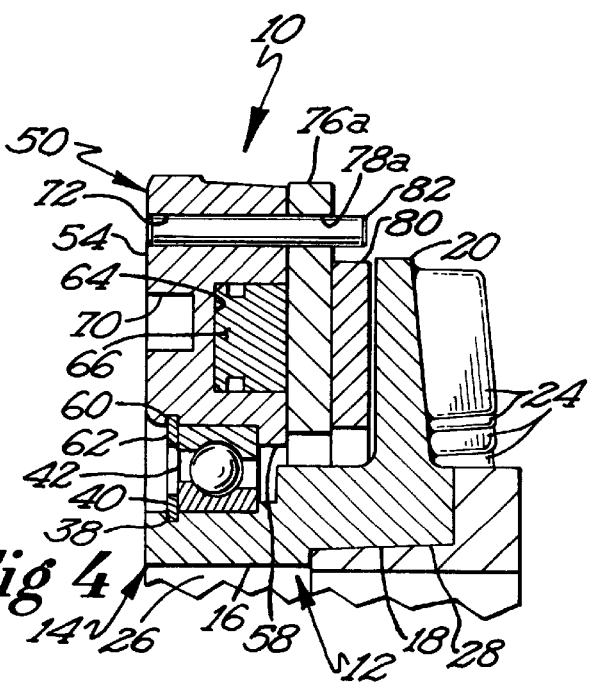
FIG. 4 shows a partial cross sectional view of the rotational control apparatus of FIG. 3.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "axial", "radial", "first", "second", "side", "end", "inner", "outer", "inside", "outside" and similar terms are used herein, it should be understood that these terms have reference only to the structure shown in the drawings as it would appear to a person viewing the drawings and are utilized only to facilitate describing the preferred embodiment.

DESCRIPTION OF THE PREFERRED EMBODIMENT

A rotational control apparatus in the preferred form of a brake with variable actuation methods according to the preferred teachings of the present invention is shown in the drawings and generally designated 10. Generally, brake 10 includes an input 12 shown in the most preferred form adapted to be mounted to a rotatable shaft. Input 12 includes a hub 14 having a first axial portion 16 and a second axial portion 18. An interface disc 20 extends radially outwardly from the end of axial portion 18 opposite axial portion 16. An interface surface 22 is formed on disc 20 facing axial portion 16. A plurality of circumferentially spaced, radially extending, linear cooling fins 24 are formed on disc 20 opposite surface 22. First portion 16 includes a center bore 26 of a constant diameter slightly larger than the shaft upon which input 12 is intended to be mounted. Second portion 18 includes a frustoconical bore 28 of decreasing size from the axial end opposite portion 16 towards portion 16, with bore 28 having a minimum diameter larger than bore 26, with a shoulder being defined between bores 26 and 28. Bore 28 is adapted to receive a quick connect coupler of a conventional design, with axial portion 18 including a plurality of axially extending, circumferentially spaced, threaded bores 32 for threadable receipt of cap screws extending through the quick connect coupler.

The outer axial surface of portion 16 includes a bearing mount 34 having an integral, axially inward race abutment shoulder 36 and a circumferential groove 38 for receiving a snap ring 40. The outer race of a bearing 42 can be axially slid on portion 16 until engagement with shoulder 36 and then held from axial movement by snap ring 40 received in groove 38.

Brake 10 according to the teachings of the present invention further includes a housing 50 of an annular configuration. Housing 50 includes a first axial side or face 52, a second axial side or face 54 and a central opening 56. A lip 58 integrally extends inwardly from face 52 into opening 56 to define an integral race abutment shoulder of a bearing mount. A circumferential groove 60 is formed in central opening 56 adjacent face 54 for receiving a snap ring 62. The inner race of bearing 42 can be axially slid in opening 56 until engagement with lip 58 and then held from axial movement by snap ring 62 received in groove 60.

Housing 50 further includes an annular piston cavity 64 axially extending from face 52. An annular piston 66 is slideably received in cavity 64. Suitable sealing provisions such as O-rings received in annular grooves are provided between piston 66 and housing 50 to create a slidable fluid seal therebetween. A fluid connection 68 is provided intersecting with cavity 64 for connection to a source of fluid pressure.

Housing 50 further includes a plurality of circumferentially spaced cavities 70 axially extending from face 54 generally opposite to cavity 64 and of a size adapted to receive an engaging spring 90. A plurality of axially extending through bores 72 are provided in housing 50 and in the preferred form axially outward of cavities 64 and 70. Alternate bores 72 each includes a countersink 74 formed in the second axial side 54 and of a size adapted to receive a release spring 92.

Brake 10 according to the preferred teachings of the present invention includes a first plate 76a having a plurality of passages or through slide bores 78a at locations corresponding to alternate bores 72 and a plurality of threaded bores 78b corresponding to the remaining bores 72. In the most preferred form, bores 78a and 78b are located in radially extending, circumferentially spaced tabs. Brake 10 according to the preferred teachings of the present invention further includes a friction or similar interface facing 80 for interfacing with surface 22 of disc 20 of input 12. Facing 80 is included on plate 76a such as by being fastened thereto such as by screws.

In a preferred form where brake 10 is desired to be spring engaged, a second plate 76b is provided of identical construction as plate 76a for reasons as will be explained further hereinafter. However, plates 76a and 76b could be of different constructions if the advantages of the same component construction are not desired. Antirotation dowel pins 82 are fixed in bores 72 not including countersinks 74 and are slideably received in through slide bores 78a of plate 76a.

Rotational control apparatus 10 according to the preferred teachings of the present invention can be assembled according to the following methods. Specifically, when it is desired to have a spring engaged brake 10, first plate 76a is positioned on input 12 so that facing 80 is adapted to interface with disc 20. Bearing 42 is slid in the bearing mount of housing 50 until bearing 42 engages lip 58 and retained in place by snap ring 62, and dowel pins 82 are fixed to housing 50 and extend beyond second axial side 54. Then, housing 50 is positioned on input 12 with second axial side 54 being intermediate first axial side 52 and disc 20 and with dowel pins 82 being aligned with the corresponding bores 78a of plate 76a. While housing 50 is being positioned on input 12, springs 90 are inserted into cavities 70 to be captured therein between housing 50 and first plate 76a. Positioning housing 50 on input 12 entails sliding bearing 42 upon bearing mount 34 until bearing 42 engages shoulder 36. Housing 50 can then be axially fixed upon input 12 by placement of snap ring 40 and is thereby rotatably mounted on input 12. Shoulder 36 and lip 58 are axially spaced on opposite axial sides of bearing 42 when housing 50 is in its second position. Piston 66 can be included on plate 76b such as by being fastened thereto such as by screws. A tubular spacer 94 is inserted in bores 72 including countersinks 74 in the preferred form, and piston 66 axially slid into cavity 64. A fastener 96 is passed through through bores 78a of plate 76b and through tubular spacer 94 and is threadably received in threaded bores 78b of plate 76a, with tubular spacer 94 being sandwiched between plates 76a and 76b. Thus, first plate 76a is interconnected to piston 66 by plate 76b and by spacer elements each defined by fastener 96 and tubular spacer 94 holding plates 76a and 76b together.

Therefore, in the second position, second face 54 of housing 50 is located intermediate first face 52 and first plate 76a, first plate 76a is located intermediate second face 54 of housing 50 and interface facing 80, and interface facing 80 is located intermediate first plate 76a and interface disc 20.

In operation and with housing 50 in its second position and in the absence of fluid pressure, springs 90 move plate 76a toward disc 20 to interface facing 80 with surface 22. Due to their interconnection by fasteners 96 and tubular spacers 94, plate 76b also moves toward disc 20 and thereby slides piston 66 into cavity 64. Interfacing facing 80 with surface 22 results in the reduction or elimination of rotational speed differences between housing 50 and input 12. As housing 50 in the preferred form is stationary, apparatus 10 acts as a brake. With the introduction of fluid pressure through connection 68 and into a fluid cavity defined by piston 66 and cavity 64, fluid pressure forces piston 66 to slide out of cavity 64 and away from interface disc 20. Plate 76b is thereby axially pushed by piston 66 to axially move away from disc 20, and since plate 76a is interconnected to plate 76b by the spacer elements, plate 76a also moves axially away from disc 20 and towards housing 50 against the bias of springs 90. When plate 76a moves axially away from disc 20, facing 80 does not interface with surface 22 so that input 12 is rotationally independent from housing 50 or in other words the rotational speeds of housing 50 and input 12 are not dependent upon each other and input 12 is free to rotate relative to housing 50.

Rotational control apparatus 10 according to the preferred teachings of the present invention can also be assembled according to the following method. Specifically, when it is desired to have a spring released brake 10, piston 66 can be included on plate 76a such as by being fasten e d thereto such as by screws. Bearing 42 is slid in the bearing mount of housing 50 until bearing 42 engages lip 58 and retained in place by snap ring 62, and dowel pins 82 are fixed to housing 50 and extend beyond first axial side 52. Piston 66 (with plate 76a) is axially slid into cavity 64 with dowel pins 82 being aligned with the corresponding bores 78a of plate 76a. Then, housing 50 can be positioned on input 12 with first axial side 52 being intermediate second axial side 54 and disc 20. Positioning housing 50 on input 12 entails sliding bearing 42 upon bearing mount 34 until bearing 42 engages shoulder 36. Housing 50 can then be axially fixed upon input 12 by placement of snap ring 40 and is thereby rotatably mounted on input 12. After passing through release spring 92, a fastener 98 is passed through countersink 74 and bore 72 and is threadably received in threaded bore 78b of plate 76a. In the most preferred form, spring 92 is located entirely within countersink 74 and the head of fastener 98 is axially within countersink 74. Therefore, in the first position, first face 52 of housing 50 is located intermediate second face 54 and first plate 76a, first plate 76a is located intermediate first face 52 of housing 50 and interface disc 20, and interface facing 80 is located intermediate first plate 76a and interface disc 20.

In operation and with housing 50 in its first position and in the absence of fluid pressure, springs 92 move plate 76a toward housing 50 and away from disc 20 and thereby slides piston 66 into cavity 64. With plate 76a moved axially away from disc 20, facing 80 does not interface with surface 22 so that input 12 is rotationally independent from housing 50 or in other words the rotational speeds of housing 50 and input 12 are not dependent upon each other and input 12 is free to rotate relative to housing 50. With the introduction of fluid pressure through connection 68 and into the fluid cavity defined by piston 66 and cavity 64, fluid pressure forces piston 66 to slide out of cavity 64. Plate 76a is thereby axially pushed by piston 66 towards disc 20 to interface facing 80 with surface 22. Interfacing facing 80 with surface 22 results in the reduction or elimination of rotational speed differences between housing 50 and input 12. As housing 50 in the preferred form is stationary, apparatus 10 acts as a brake.

It should be appreciated that the methods of assembly of apparatus 10 set forth are exemplary only, as multiple methods of assembly can be utilized according to the teachings of the present invention. As an example, the order of the methods can be changed such as initially positioning bearing 42 on input 12 rather than in housing 50 when housing 50 is assembled in the first position.

Now that the basic construction, methods of assembly, and operation of apparatus 10 in the first and second positions have been set forth, some of the advantages of the present invention can be highlighted. Specifically, with the general exception of springs 90 and 92, tubular spacers 94 and fasteners 96 and 98, all of the remaining components are of the same construction whether apparatus 10 is fluid engaged or fluid released. This is of significance, as it is only necessary to inventory one type of each part required, and the parts are selected from the same inventory to create apparatus 10 with different actuation methods. This is particularly beneficial for input 12 and housing 50 as these are of larger size which requires larger cost molds, more material, and increased machining. As such components are shared in apparatus 10 having different actuation methods, the number of molds are reduced and increase component numbers result in lower component costs. Such increased component number advantages also are obtained by other components including piston 66, plates 76, and facing 80.

Further, although in its preferred form, apparatus 10 is constructed to allow the manufacturer to select and assemble the components according to the particular manner of actuation method desired, the distribution center and/or ultimate user of apparatus 10 could be provided with a kit to allow conversion of apparatus 10 from one manner of actuation to another after manufacture according to the teachings of the present invention.

Furthermore, apparatus 10 according to the teachings of the present invention utilizes the identical fluid cavity defined by piston 66 and cavity 64 in housing 50 whether fluid engaged or fluid released actuation is desired. In particular, it is not necessary to plug fluid passages in housing 50, to insert additional components to define a different fluid cavity, or the like, as was required in U.S. Pat. Nos. 4,425,993 and 4,460,079 which create different sealing situations and/or create increased numbers of components. Thus, apparatus 10 according to the teachings of the present invention has reduced component numbers and tolerance requirements over prior variable actuation rotational control apparatus.

Now that the basic teachings of the present invention have been explained, many extensions and variations will be obvious to one having ordinary skill in the art. As an example, although apparatus 10 has been shown in its most preferred form as a brake, apparatus 10 for controlling other forms of rotation and/or for utilization in other applications can be constructed according to the teachings of the present invention.

Likewise, although in the preferred form, plate(s) 76b and/or 76a are moved and forced by a single piston 66 and is believed to be advantageous for at least reduction of components and simplicity, piston 66 could be formed in other manners including but not limited to as including more than one piston 66 and cavity 64 combinations.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Rotational control apparatus comprising, in combination: an input having a radially extending interface disc; a first plate including an interface facing for interfacing with the interface disc; an annular housing including a first axial side and a second axial side; at least a first axially extending piston cavity formed in the first axial side; and at least a first piston slideably received in the first piston cavity with a fluid cavity being defined by the first piston and the first piston cavity with fluid pressure being introduceable into the fluid cavity to force the first piston out of the first piston cavity, with the input being rotatably mounted relative to the housing with the housing being positionable in first and second positions, with the first position of the housing permitting axial movement of the piston out of the first cavity and towards the interface disc to interface the interface disc and the interface facing and permitting axial movement of the piston into the piston cavity and away from the interface disc to allow free relative rotational movement of the interface disc and the interface facing and with the second position of the housing permitting axial movement of the piston out of the first cavity and away from the interface disc to allow free relative rotational movement of the interface disc and the interface facing and permitting axial movement of the piston into the piston cavity and towards the interface disc to interface the interface disc and the interface facing.

2. The rotational control apparatus of claim 1 further comprising, in combination: a first bearing mount formed on the input; a second bearing mount formed in the housing; and a bearing mounted in the first and second bearing mounts to rotatably mount the input relative to the housing, with the bearing being mountable on the input to allow the housing to be flipped 180° on the input.

3. The rotational control apparatus of claim 2 with the first bearing mount including a shoulder integral with the input and the second bearing mount including a shoulder integral with the housing, with the shoulders of the bearing mounts being axially aligned in the first position and being axially spaced in the second position.

4. The rotational control apparatus of claim 2 with the first piston cavity and the first piston being annular in shape.

5. The rotational control apparatus of claim 4 with the second side of the housing located intermediate the first side of the housing and the first plate, the first plate located intermediate the second side of the housing and the interface facing and the interface facing located intermediate the first plate and the interface disc in the second position, with the first plate being interconnected to the first piston.

6. The rotational control apparatus of claim 5 further comprising, in combination: at least a first spacer element holding the first piston and the first plate together in the second position.

7. The rotational control apparatus of claim 6 further comprising, in combination: at least a first through bore axially extending through the housing for slideable receipt of the first spacer element.

8. The rotational control apparatus of claim 7 with the first through bore including a countersink formed in the second axial side and of a size adapted to receive a release spring in the first position.

9. The rotational control apparatus of claim 7 further comprising, in combination: a second plate upon which the first piston is mounted, with the first spacer element extending between the first and second plates.

10. The rotational control apparatus of claim 9 further comprising, in combination: a threaded bore formed in one of the first and second plates; a passage formed in the other of the first and second plates, with the spacer element including a tubular spacer and a fastener, with the fastener extending through the passage, through the tubular spacer and threadably received in the threaded bore, with the tubular spacer extending through the through bore and being sandwiched between the first and second plates.

11. The rotational control apparatus of claim 6 further comprising, in combination: at least a first slide bore extending axially through the first plate; and at least a first dowel pin extending from the housing and through the slide bore of the first plate.

12. The rotational control apparatus of claim 5 further comprising, in combination: at least a first engaging spring biasing the first plate away from the second axial side of the housing in the second position.

13. The rotational control apparatus of claim 12 further comprising, in combination: at least a first axially extending engaging spring cavity formed in the second axial side adapted to receive the first engaging spring.

14. The rotational control apparatus of claim 4 with the first axial side of the housing located intermediate the second axial side of the housing and the first plate, the first plate located intermediate the first axial side of the housing and the interface disc and the interface facing located intermediate the first plate and the interface disc in the first position, with the first plate including the piston.

15. The rotational control apparatus of claim 14 further comprising, in combination: at least a first through bore axially extending through the housing; a threaded bore formed in the first plate; a fastener extending through the first through bore and threadably received in the threaded bore of the first plate, with the fastener including an enlarged head; and a release spring located concentrically on the fastener intermediate the enlarged head and the housing and the housing is intermediate the first plate and the release spring.

16. The rotational control apparatus of claim 15 with the first through bore including a countersink formed in the second axial side and receiving the release spring.

17. The rotational control apparatus of claim 16 further comprising, in combination: at least a first axially extending engaging spring cavity formed in the second axial side adapted to receive an engaging spring in the second position.

18. The rotational control apparatus of claim 16 further comprising, in combination: at least a first slide bore extending axially through the first plate; and at least a first dowel pin extending from the housing and through the slide bore of the first plate.

19. Method for assembling a rotational control apparatus comprising: providing an input having a radially extending interface disc; positioning a first plate including an interface facing on the input with the interface facing adapted to interface with the interface disc; providing an annular housing including a first axial side and a second axial side, with at least a first axially extending piston cavity formed in the first axial side; slideably receiving at least a first piston in the piston cavity with a fluid cavity being defined by the first piston and the first piston cavity with fluid pressure being introduceable into the fluid cavity to force the first piston out of the first piston cavity, with the housing being positionable in both first and second positions, with the first position of the housing permitting axial movement of the piston out of the first cavity and towards the interface disc to interface the interface disc and the interface facing with the piston being moved into the piston cavity and away from the interface disc to allow free relative rotational movement of the interface disc and the interface facing and with the second position of the housing permitting axial movement of the piston out of the first cavity and away from the interface disc to allow free relative rotational movement of the interface disc and the interface facing with the piston being moved into the piston cavity and towards the interface disc to interface the interface disc and the interface facing; and rotatably mounting the housing to the input in one of the first and second positions.

20. The method of claim 19 with providing the annular housing comprising providing the annular housing including at least a first axially extending engaging spacing cavity formed in the second axial side and at least a first through bore axially extending through the housing for slideably receiving a fastener threadably received in the first plate, with the first through bore including a countersink formed in the second axial side and of a size adapted to receive a release spring; and with rotatably mounting the housing including flipping the housing 180° on the input between the first and second positions.

* * * * *